June 28, 1960   LE ROY F. ENGLISH   2,942,813
COMBINED SPEED BRAKE, ESCAPE HATCH AND
BAGGAGE ACCESS DOOR FOR AIRCRAFT
Filed Feb. 14, 1958   3 Sheets-Sheet 1
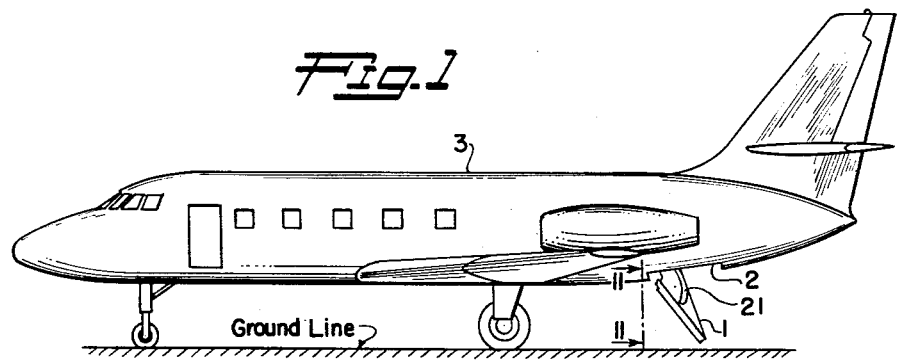
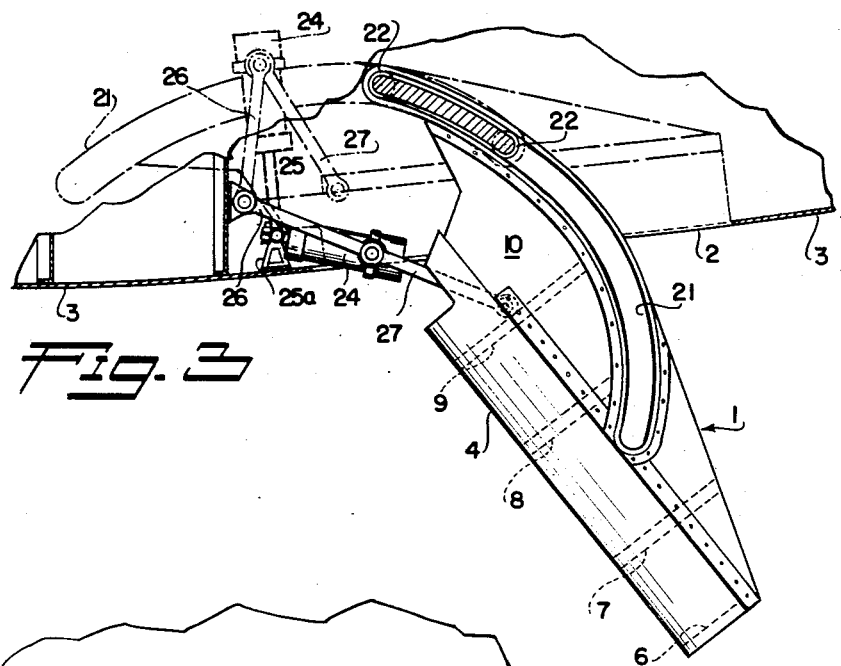
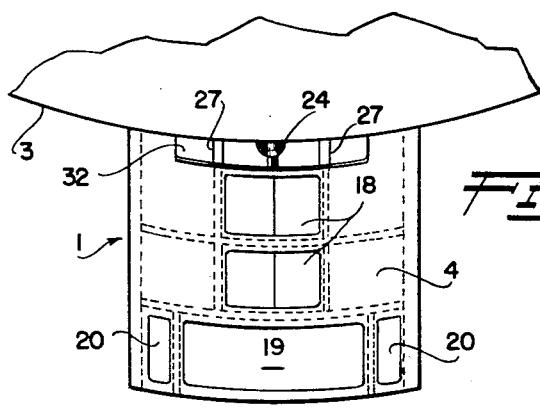
INVENTOR.
LE ROY F. ENGLISH
BY
Agent

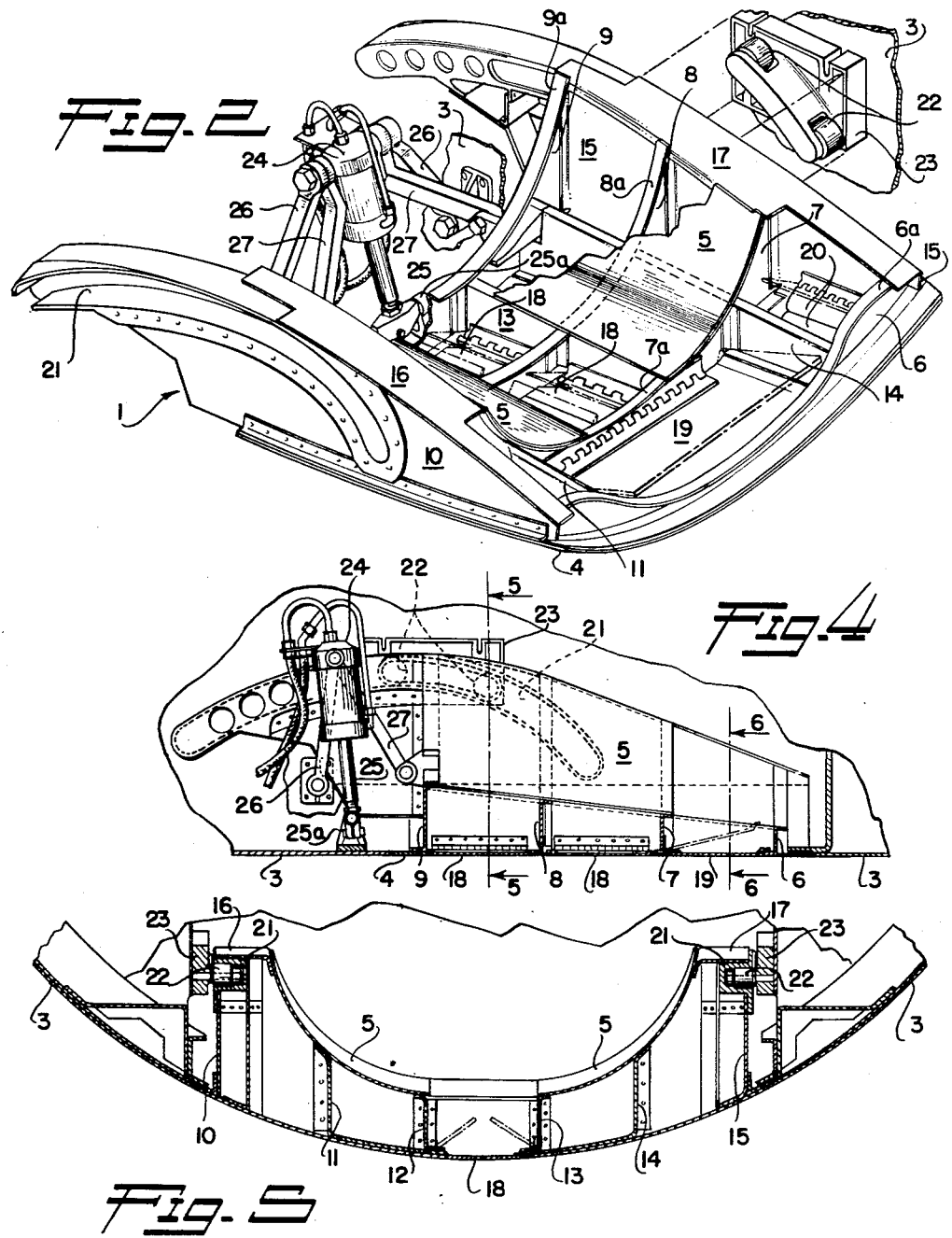

June 28, 1960  LE ROY F. ENGLISH  2,942,813
COMBINED SPEED BRAKE, ESCAPE HATCH AND
BAGGAGE ACCESS DOOR FOR AIRCRAFT
Filed Feb. 14, 1958  3 Sheets-Sheet 3
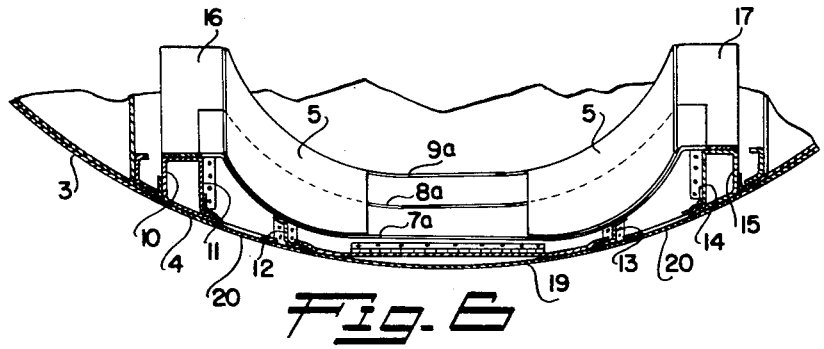
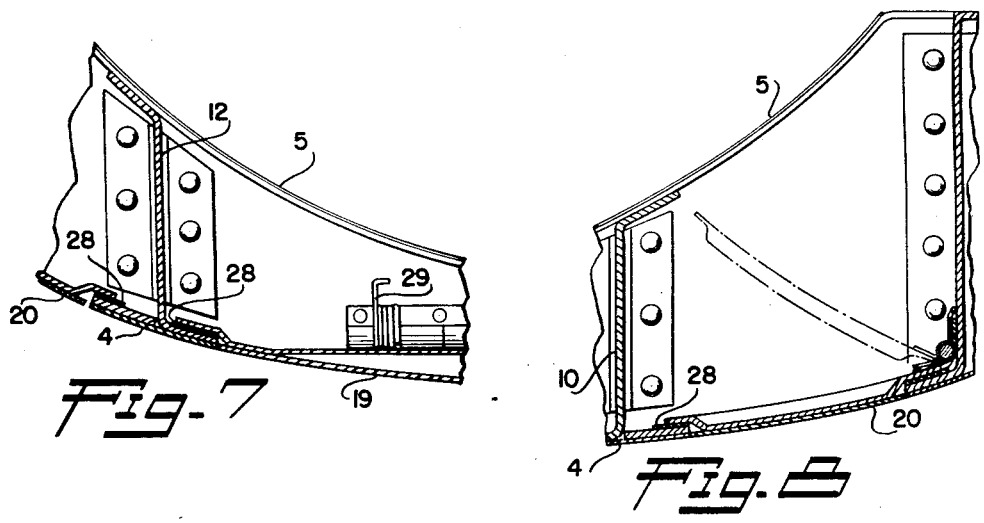
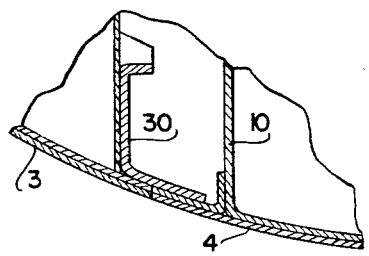
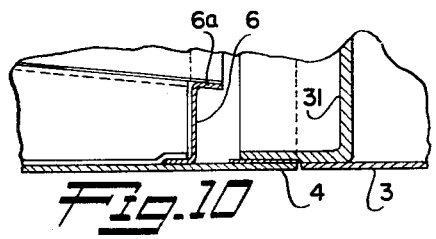
INVENTOR.
LE ROY F. ENGLISH
BY
Agent

United States Patent Office 2,942,813
Patented June 28, 1960

2,942,813

COMBINED SPEED BRAKE, ESCAPE HATCH AND BAGGAGE ACCESS DOOR FOR AIRCRAFT

Le Roy F. English, Northridge, Calif., assignor to Lockheed Aircraft Corporation, Burbank, Calif.

Filed Feb. 14, 1958, Ser. No. 715,283

11 Claims. (Cl. 244—129)

This invention relates to structure means for permitting access to and from an aircraft interior and aircraft speed retarding means during flight, and more particularly, to a combination unitary structural device capable of serving as an in-flight speed brake for the aircraft, a personnel emergency escape chute and an on-ground access door and ladder to the aircraft interior.

Modern day aircraft contain many contrivances, each of which is specially required to achieve a desired object or result. Some of such that are known in the prior art are: an in-flight speed brake, which usually consists of a panel member, either perforate or imperforate, that is mechanically moved into the free air stream around the outer surfaces of the aircraft to slow it down; a personnel escape hatch to be used for emergency exit from the aircraft when in-flight emergencies arise; and, access doors and ladders to the interior of the aircraft for placement or removal of baggage or cargo when the aircraft is on the ground. Heretofore known aircraft were not of the nature that required all of the devices listed; that is, the speed brake was generally limited to high speed military aircraft, whereas the type of aircraft requiring or having a baggage or cargo access door and ladder were in the operational spectrum requiring or necessitating a speed brake. As for the escape hatch, such is applicable to both high speed military type aircraft requiring a speed brake and the slower type cargo and/or personnel carrier types of aircraft utilizing an access door and ladder. However, in aircraft requiring a plurality of such devices there has usually been a plurality of separate operating mechanisms, one for each device or structure and system, culminating in a plurality of control or actuating systems and an increase in the operational weight of the aircraft.

Accordingly, it is an object of this invention to provide a unitary structural device that can operate as a speed brake, a personnel escape chute and an access door ladder.

It is a further object of this invention to provide a combined unitary structural device enabling a reduction in the number of operating mechanisms, structures and systems required.

Another object of this invention is to provide a device for operating as an in-flight speed brake at any flight speed the aircraft is capable of while having means limiting the total air pressure forces reacting against the brake structure when extended.

A still further object of this invention is to provide a device for an emergency escape hatch chute for personnel capable of providing a windbreak permitting escaping personnel to clear the aircraft before the air blast hits him.

A still further object of this invention is to provide a device for an access door and ladder for loading or unloading baggage or cargo to or from the aircraft interior when on the ground, the door containing stationary ladder steps integral therewith.

A still further object of this invention is to provide a device combining the functions of an in-flight speed brake, personnel emergency escape hatch chute and access door with ladder for an aircraft that consists of one operating mechanism, structure and system, while yet containing all the desirable features of each device.

It is a still further object of this invention to provide a unitary structural device in an aircraft for operating as an in-flight speed brake, personnel emergency escape hatch chute or access door with ladder that is unique in design and containing a simple integration with the aircraft fuselage while yet operable with a single operating mechanism and system.

Other objects and advantages will become apparent from the following description taken in connection with the accompanying drawing showing one of the embodiments of the invention in which:

Figure 1 is an elevational view of an aircraft incorporating the combined structure, with the air-craft on the ground and the door structure extended;

Figure 2 is a perspective view of the combined door structure;

Figure 3 is a partial cross-sectional view of the portion of the aircraft adjacent the combined door structure, and showing the door structure in extended position, including the actuation and linkage details for actuation thereof;

Figure 4 is a partial cross-sectional view through the longitudinal centerline of the combined door structure when in a retracted position;

Figure 5 is a cross-sectional view taken along line 5—5 of Figure 4;

Figure 6 is a cross-sectional view taken along line 6—6 of Figure 4;

Figures 7 and 8 are enlargements of the details in cross section showing the sealing arrangements between the combined door structure and the spring-loaded doors therein;

Figure 9 is an enlargement of the details in cross section showing the sealing arrangement between the lateral sides of the combined door structure and the fuselage;

Figure 10 is an enlargement of the details in cross section showing the sealing arrangement between the aft end of the combined door structure and the fuselage; and Figure 11 is a view taken along line 11—11 of Figure 1.

Generally stated, one embodiment of the invention is practiced by a unitary door like structure that is extendable from the aircraft fuselage envelope proper, such structure incorporating the features of a speed brake for in-flight operation, a personnel escape hatch chute for in-flight evacuation of personnel during in-flight operation emergencies, and an access door with ladder to the aircraft fuselage interior when the aircraft is on the ground.

Referring more particularly to the drawings, Figure 1 shows the combined door like structure 1 in extended position from opening 2 in aircraft fuselage 3, and indicating the adjacent juxtaposition of the aft end of the combined structure 1 with the ground line when the aircraft is sitting on the ground. For the structure 1 to operate as an emergency escape passage chute and an access door ladder, it is necessary for such to be located on the lower portion of the aircraft fuselage 3. However, the longitudinal location thereof as shown in Figure 1 is the preferred location in view of the type of aircraft depicted as an example, it being understood that other types of aircraft structure 1 may have any other longitudinal location that is readily accessible to the baggage or cargo compartment and/or the passenger compartment.

Referring to Figures 2 and 3, the combined structure 1 comprises an outer surface member 4, which is shaped to fit flush in the opening 2 in fuselage 3 when in a retracted position, the shape of the surface formed by member 4 conforming to the outer surface of fuselage 3. The inner surface is formed by two arcuate or bowed sheet members 5 secured in fixed relation to outer surface member 4 by a plurality of transverse structural members 6, 7, 8 and 9, having flanges 6a, 7a, 8a and 9a along the inboard sides thereof, and longitudinal structural members 10, 11, 12, 13, 14 and 15, with the assembly of structural members 6–15 with outer surface member 4 and the arcuate sheet members 5 being by welding, riveting, or any other appropriate securing or fastening means.

The sheet members 5 cover only a portion of assembly of structural members 6–15 as can be more clearly seen in Figure 2, in that the forward lateral edges are on flange 9a and the aft lateral edges are on flange 7a, while the longitudinal edges of one member 5 are connected to longitudinal structural member 12 and to longitudinal structural member 10 by an intermediate member 16, while the other member 5 is connected to longitudinal structural member 13 and to longitudinal structural member 15 by an intermediate member 17. Thus, with members 5 secured to the assembly in this manner there is presented a shallow U-shaped chute or channel surface upon which a person can slide out of the aircraft on during in-flight emergencies when the combined door like structure 1 is extended from the fuselage 3. It is also to be noted use of the structure 1 in an emergency escape application, in that when the structure 1 is extended from the aircraft, it serves as a substantial shield for the person thereon to prevent his escape path from being interfered with by the windblast of the airflow on the external surface of fuselage 3 as he must be past the transverse structural member 6 before any such interference can occur. By that time he will be considerable distance below the lower surface of fuselage 3.

In order to prevent excessive air pressure forces against the combined structure 1 when extended in flight, there are included a plurality of spring loaded or biased doors 18, 19 and 20. Such permits a flow of air through the structure 1, thus allowing the structure 1 to be extended from the aircraft for operation as a speed brake at any air speed which the aircraft is capable of operating at, and yet keeping the total air pressure forces against the structure 1 within design limits. The doors 18 which are located between longitudinal structural members 12 and 13 and transverse structural member pairs 7–8 and 8–9 each consists of two portions, with each of the portions pivoted on hinges located on their longitudinal sides so as to swing inwardly in a transverse direction, as indicated by the phantom lines in Figures 2 and 5. The doors 20, which are located between structural members 6–10–7–11 and 6–14–7–15, are of unitary construction and swing inwardly in a transverse direction on hinges located on their longitudinal sides fartherest removed from the centerline of structural 1. Door 19 is also of a unitary construction located between structural members 6–11–7–14 and pivots inwardly around a lateral extending hinge at its forward lateral edge, as is illustrated in the phantom lines in Figures 2 and 4.

Inasmuch as inner surface sheet members 5 do not completely cover the lateral distance between longitudinal structural members 12 and 13, the lateral structural members 6, 7, 8 and 9 provide steps so that the structure 1 can also serve as an access door with integral ladder when it is extended while the aircraft is on the ground. Furthermore, the lack of lateral coverage between longitudinal structural members 12 and 13 by members 5 permits through air passages when doors 18, 19 and 20 are open for load reductions on structural 1 when extended in flight as a speed brake.

Integral with the longitudinal structural members 10 and 15 are cam roller channels 21 which ride on rollers 22 mounted on roller brackets 23 which are secured to the aircraft fuselage 3. The co-action between channels 21 and rollers 22 guides the structure 1 during actuation so that it follows a predetermined path dictated by the cam roller channels 21. Movement is accomplished by a hydraulic actuator 24 having an actuator rod 25 pivotally affixed to aircraft fuselage 3 by a bracket 25a. The body of actuator 24 is pivotally connected to the aircraft fuselage 3 by links 26 and to the structure 1 by links 27. Referring to Figure 3 the relation of actuator 24 and links 26, 27 with the structure 1 when extended from the fuselage 3 is shown in solid lines, while the relationship between these members when structure 1 is retracted flush with the fuselage is shown in phantom lines. It is to be noted that actuator rod 25 is retracted into actuator 24 when structure 1 is extended from the aircraft fuselage 3, while actuator rod 25 is extended from the hydraulic actuator 24 when the structure 1 is retracted in opening 2 and flush with the aircraft fuselage 3. It is to be understood that any type of actuating means may be used for extending structure 1 from fuselage 3, with the hydraulic actuator 24 as being shown merely signifying a desirable type which is located inboard when door structure 1 is retracted and that moves to an out of the way position or location when door structure 1 is extended.

Figures 7 and 8 show the details of doors 19 and 20 seating in the openings of the outer surface member 4, which includes a Thiokol or rubber gasket sealing means 28 between the overlapping surfaces of the door structure proper and the outer surface member 4 of structure 1. Seal 28 also prevents chattering or vibration of the doors on the contiguous portions of member 4. Any appropriate type of sealing arrangement may be incorporated, and it being understood that the same type of sealing arrangement will be also used with doors 18. Also shown in Figure 7 is a portion of the hinge for door 19 with a coil spring 29 incorporated therewith for biasing the door 19 toward a closed position, again it being understood that this is only one means of biasing the doors closed and is not intended to be exclusive.

Figure 9 shows the metal to metal sealing arrangement along the longitudinally extending adjacent sides of fuselage 3 and outer surface member 4 when the door structure 1 is retracted. A channel-like member 30 secured to the aircraft fuselage 3 is in overlapping engagement with the adjacent surfaces of aircraft fuselage 3 and outer surface member 4. Figure 10 shows the seal between the aft lateral edge of outer surface member 4 and fuselage 3 which comprising an L-shaped member 31 secured to fuselage 3 and extending forward to overlap the joint between adjacent edges of fuselage 3 and outer surface member 4. This closure seal is also metal to metal similar to that shown in Figure 9.

The forward lateral edge of door structure 1 is shaped to provide an additional air passage 32 therethrough when door structure 1 is extended from the aircraft for in-flight operation as a speed brake, as can be seen in Figure 11. As indicated above, with the air passages providing for a maximum limit of air pressure loads on the structure proper, the structure 1 can be extended to serve as a speed brake at any speed of the aircraft within the speed range the aircraft is capable of operating in. It has been the experience when using this type of structure in actual flight tests that during flight, when the aircraft is properly trimmed, extension of the structure to serve as a speed brake has not resulted in any deleterious effect for deterioration of the trimmed condition of the aircraft that existed prior to extension of the door structure 1.

In operation the combined structure 1 may be extended during flight to serve as a speed brake whereupon any excess air pressure loads on the structure will be relieved by air flow through passage 32 or the opening of spring loaded doors 18, 19 and 20. Should an in-flight emergency arise requiring evacuation of personnel in the aircraft, the structure may be extended, which in turn will put the hydraulic actuator 24 in an out of the way position, and evacuation can be made by personnel dropping from the aircraft by sliding down the chute like channel generated by the arcuate or bowed sheet members 5, the structure 1 in turn serving as a windblast protection for the evacuating personnel until they have cleared the lower portion of the fuselage 3 aft of opening 2.

When the aircraft is on the ground, by having the door structure 1 located adjacent or near the baggage stowage area of the aircraft, free access to such can be had by extending the structure and ingress or egress can be accomplished by utilizing the steps generated by the transverse structure members 6, 7, 8 and 9.

Thus it can be seen that I have combined three separate and individually functional devices into one combined structure requiring only one operating mechanism. A considerable reduction in the space and weight requisites are accomplished over the use of three separate operable systems.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed is:

1. In an aircraft having a fuselage with an opening therein, a door like structure, means linking said door structure to the aircraft fuselage, actuating means connected to both the door structure and the aircraft fuselage for extending and retracting the door structure between a retracted position fitting flush with the fuselage opening and an extended position whereby the door structure extends externally of the exterior of the fuselage, said door structure having inner and outer surface members fixedly secured to opposite sides of a plurality of lateral structural members, said outer surface member shaped to conform as the continuation of the outer fuselage surface over the fuselage opening when the door structure is in the retracted position, said outer surface member serving as an aircraft speed brake when in the extended position during flight, said inner surface formed by two laterally spaced members forming a shallow elongate slideway of concave cross-section thereby providing an in-flight personnel emergency escape chute when the door structure is in extended position during flight, and the portion of said lateral structural members between the laterally spaced inner surface members serving as steps of an access ladder to the fuselage interior when the door structure is extended and when the aircraft is on the ground.

2. The device as claimed in claim 1 wherein the linking means between the door structure and aircraft fuselage comprises a cam channel on each side of the door structure, and roller means affixed to the fuselage adjacent opposite sides of said opening, said roller means registering in the cam channels for guiding the direction of the door structure when actuated for movement from one position to another.

3. A unitary door structure providing a combined speed brake, emergency personnel escape chute, and access door ladder for an aircraft comprising; a plurality of lateral extending structural members, a plurality of longitudinal extending structural members, said lateral and longitudinal structural members united to form a structural frame, an outer surface member having a plurality of openings therein, said outer surface member secured to cover one side of said structural frame and shaped to conform to the outer surface of an aircraft fuselage, a pair of inner surface members, said inner surface member secured to cover a portion of the inner side of the structural frame with a lateral displacement relative to each other to enable the portion of the lateral structural members extending between the adjacent sides of the inner surface members to provide integral access door ladder steps, said inner surface members shaped to form a shallow elongate slideway of concave cross-section, said slideway providing an emergency personnel escape chute, and air pressure relief means mounted in the outer surface member openings for preventing excessive air pressure loads on the unitary structure when used as an aircraft speed brake.

4. A unitary structure assembly for an aircraft comprising a first member, said first member constituting a speed brake having a surface of curvature conforming to an aircraft fuselage, at least two second members spaced from said first member, said second members constituting an emergency personnel escape chute as a shallow elongate slideway of concave cross-section, and a plurality of integral structural members located between and interconnecting said first and second members together maintaining said first and second members in fixed relative positions, at least some of said integral structural members constituting access door ladder steps.

5. A unitary structural assembly for aircraft comprising a first member having a plurality of openings therein, said first member constituting a speed brake having a surface of curvature conforming to an aircraft fuselage, at least two second members spaced from said first member, said second members constituting an emergency personnel escape chute as a shallow elongate slideway of concave cross-section, and a plurality of integral structural members located between and interconnecting said first and second members together maintaining said first and second members in fixed relative positions, at least some of said integral structural members constituting access door ladder steps, and air pressure relief means mounted in the outer surface member openings for preventing excess of air pressure loads on the unitary structure when used as an aircraft speed brake.

6. A device as claimed in claim 5 wherein the air pressure relief means comprises spring biased doors hingedly connnected contiguous to the openings in the first member.

7. In an aircraft having a fuselage with an opening therein, an extendible unitary door-like structure assembly capable of fitting in the opening in a retracted position flush with the fuselage exterior, means linking said assembly to the aircraft fuselage, actuating means, said actuating means operatively connected to both the assembly and the aircraft fuselage to move the assembly to extend externally of the fuselage, said assembly comprising a first member, said first member constituting a speed brake having a surface of curvature conforming to the aircraft fuselage, at least two second members spaced from said first member, said second members constituting an emergency personnel escape chute as a shallow elongate slideway of concave cross-section, and a plurality of integral structural members located between and interconnecting said first and second members together maintaining said first and second members in fixed relative positions, some of said integral structural members constituting access door ladder steps.

8. In an aircraft having a fuselage with an opening therein, a unitary door like structure assembly fitting in the opening flush with the fuselage exterior, a cam channel on each of two opposite sides of the assembly, roller means affixed to the fuselage on each of two opposite sides of the fuselage opening, actuating means, said actuating means operatively connected to both the assembly and aircraft fuselage to move the assembly to extend externally of the fuselage, the direction of movement of the assembly during such extension being guided by the coaction between said roller means and said cam channels, said assembly comprising a first member, said first member constituting a speed brake having a surface of curvature conforming to the aircraft fuselage, at least two second members spaced from said first member, said second members constituting an emergency personnel escape chute as a shallow elongate slideway of concave cross-section, and a plurality of integral structural members located between and interconnecting said first and second members together maintaining said first and second members in fixed relative positions, some of said integral structural members constituting access door ladder steps.

9. In an aircraft having a fuselage with an opening therein, a unitary door like structure assembly fitting in the opening flush with the fuselage exterior, a cam channel on each of two opposite sides of the assembly, roller means affixed to the fuselage on each of two opposite sides of the fuselage opening, actuating means, said actuating means operatively connected to both the assembly and aircraft fuselage to move the assembly to extend externally of the fuselage, the direction of movement of the assembly during such extension being guided by the coaction between said roller means and said cam channels, said assembly comprising a first member having a plurality of openings therein, said first member constituting a speed brake having a surface of curvature conforming to the aircraft fuselage, at least two second members space from said first member, said second members constituting an emergency personnel escape chute as a shallow elongate slideway of concave cross-section, and a plurality of integral structural members, said first and second members maintained in fixed relative positions by said integral structural members located between and interconnecting said first and second members together maintaining said first and second members in spaced relative positions, some of said structural members constituting access door ladder steps, and air pressure relief means mounted in the first member openings for preventing excessive air pressure loads on the assembly when extended for use as an aircraft speed brake.

10. In an aircraft having a fuselage with an opening therein, a unitary door like structure assembly fitting in the opening flush with the fuselage exterior and extendible from the fuselage while in flight or on the ground to provide a combined speed brake and access door ladder comprising: a plurality of laterally extending structural members, a plurality of longitudinally extending structural members, said lateral and longitudinal structural members united to form a cellular honeycomb structural frame, an outer surface member having a plurality of openings therein, said outer surface member secured to and covering one side of said structural frame and shaped to conform to the outer surface of the aircraft fuselage, each of said openings in the outer surface member located in alignment with one of the cells of the structural frame, and air pressure relief means mounted in the outer surface member openings for preventing excessive air pressure loads on the door structure when used as an aircraft speed brake, said lateral structural members providing integral access door ladder steps when the door is open while the aircraft is on the ground.

11. A device as claimed in claim 10 wherein the air pressure relief means comprises spring biased doors hingedly connected contiguous the openings in the outer surface member.

References Cited in the file of this patent

UNITED STATES PATENTS

| | | |
|---|---|---|
| 2,345,615 | Manson et al. | Apr. 4, 1944 |
| 2,389,160 | Manson et al. | Nov. 20, 1945 |
| 2,481,454 | Steele et al. | Sept. 6, 1949 |
| 2,547,811 | Burnelli | Apr. 3, 1951 |
| 2,791,385 | Johnson | May 7, 1957 |

FOREIGN PATENTS

| | | |
|---|---|---|
| 911,454 | Germany | May 13, 1954 |

OTHER REFERENCES

Ser. No. 252,299, Dornier (A.P.C.), published May 25, 1943.

Flight Magazine, July 30, 1954, Vol. No. 66, Issue No. 2375, Page 137.